March 25, 1924.

H. A. HOUSE

BAKING OR COOKING APPARATUS

Filed July 12, 1917

H. A. HOUSE

BAKING OR COOKING APPARATUS

Filed July 12, 1917    8 Sheets—Sheet 4

1,488,251

Inventor
Henry A. House
By his Attorney

March 25, 1924.

H. A. HOUSE

BAKING OR COOKING APPARATUS

Filed July 12, 1917   8 Sheets-Sheet 5

1,488,251

Inventor
Henry A. House
By Earl P. Cooper
His Attorney

Patented Mar. 25, 1924.

1,488,251

UNITED STATES PATENT OFFICE.

HENRY A. HOUSE, OF BRIDGEPORT, CONNECTICUT.

BAKING OR COOKING APPARATUS.

Application filed July 12, 1917. Serial No. 180,106.

*To all whom it may concern:*

Be it known that I, HENRY A. HOUSE, a citizen of the United States of America, and a resident of Bridgeport, in the county of Fairfield and State of Connecticut, have invented certain new and useful Improvements in Baking or Cooking Apparatus, of which the following is a specification.

The present invention relates to improvements in baking or cooking apparatus or ovens, and particularly such ovens as are used in bakeries for baking in great quantities, an object of the invention being to provide such an oven by which the baking process may be carried out in an efficient, uniform and practically automatic manner. To this end I propose to provide in such an oven, a feeding and conveying means, which will feed the dough automatically and convey the same through cooking or baking chambers to completion, and then provide for the automatic removal of the same. I also propose improved feeding and removal means, by means of which a portion of the conveyor may be intermittently stopped to permit of removing the finished product and the placing on the conveyor of dough or other raw material, without disturbing the continuous movement of the rest of the conveyor.

In conveyor systems heretofore in use, much difficulty has been experienced in producing a conveyor in which the tray units would always be maintained in an absolutely horizontal position. An object of my invention is to provide means by which the horizontal position of the trays will be maintained, and at the same time provide means for positively and continuously moving the conveyor in an unvarying and uniform manner without vibration, each tray maintaining an exact relation to its neighbor entirely through the apparatus, to the end that the products being cooked will be thoroughly and uniformly cooked. With this in view, I propose an improved power system which will positively and uniformly impart direct power throughout the apparatus, the whole being driven preferably from one main drive means.

Another object is to provide an improved conveyor with which there will be a minimum resistance to the flow of heat through the apparatus, and which will permit access of the heat to all sides of the product in a manner most effective for the proper cooking or baking thereof. In order to resist the destructive effect of the heat, I propose to provide novel means, as a result of which the working and moving parts of the apparatus will in no way suffer detriment, or their operation be impaired from the high temperature in the oven. A further object is to so construct the parts that standardization may be maintained, and simplicity and economy of manufacture effected. It is also an object to provide an improved tray which may be quickly inserted in and removed from the conveyor in a correct manner, and without the necessity for removing or adjusting fastening means or other parts the whole apparatus being so arranged and designed that the same may be immediately controlled and regulated by the operator.

A still further object is to provide means for taking up any slack or looseness that may develop in the conveyor, so that its proper working relation may be automatically and constantly maintained.

With these and other objects in view which will hereinafter appear, an embodiment of my invention is shown in the accompanying drawings, and will be hereinafter more fully described with reference thereto, and finally pointed out in the claims.

In the accompanying drawings.

Similar reference characters indicate corresponding parts throughout the several figures of the drawings.

Referring to the drawings, and more particularly to Figures 1 to 4 thereof, the embodiment of my invention, which is illustrative only, comprises a main frame consisting of the uprights 10 formed of angle irons, and connected at the top by a rectangular frame 11.

A plurality of angle bars 12 and 13 are provided at each side of the oven, and are secured to the inner sides of the uprights 10 in vertically spaced relation to each other. The oven is entirely closed at the rear by a sheet metal plate 14, and at the front by a sheet metal plate 15, provided near the top and bottom respectively with entrance and exit openings 16 and 17. At each end of the oven there are provided a plurality of shafts 18 and 19 supported in bearings 20, secured to the uprights 10, one above the other mounted on the shafts 18 and 19 within the oven and adjacent to the sides thereof are sprocket wheels 21 and 22, and 23 and 24 respectively, which engage conveyor chains hereinafter more fully referred to. Gears 25 and 26 are provided at one end of each of the respective shafts 18 and 19, and disposed between the same are pinions 27 and 28, mounted in bearings 29 and 30, secured to the uprights 10 at the opposite sides from the bearings 20. Movement is imparted to this chain of gears, and thence to the conveyor sprockets by worm gears 31 and 32 provided respectively on the projected ends of the lowermost shafts 18 and the lowermost pinion 28. The worm gears 31 and 32 engage worms 33 and 34 carried by a longitudinally disposed main drive shaft 35 mounted in bearings 36 and provided at one of its ends with a pulley wheel 37. The pulley wheel 37 may be driven from any suitable source of power, as for instance an electric motor.

The oven is divided into a plurality of superposed chambers or partitions by means of sectional partition plates 38 grooved at their transverse overlapping end portions, as at 39 and 40, so that a close and interlocking relation is maintained between them. The longitudinal side portions of the plates 38 are bent upwardly as at 41 and 42 and are supported on the angle bars 12 and 13, so that the main portions of the partition plates are in the same plane as the lateral portions of the said angle bars 12. The chambers formed by the partitions are caused to communicate with each other by curving the alternate end plates in proximity to the shafts 18 and 19 into engagement with the said shafts as indicated at 43. The end plate at the opposite end engages the end of the oven. The chambers of the oven may all be of the same size, or, as clearly shown in Figure 2, in which the conveyor is indicated at 44 in dot and dash lines, some of them may be made larger than others in order to produce the desired heat effect. The partitioning of the oven in addition to providing heat radiating surfaces, permits of the maintenance of varying temperatures in different parts of the oven.

Heat is supplied to the oven by means of a hot air or steam supply pipe 46, and is carried off by an outlet or exhaust pipe 45. The pipes 45 and 46 are connected to a plurality of longitudinally disposed distributing pipes 47 and 48 by short connections 49 and 50, provided with control valves 51 and 52. The respective pipes 47 and 48 extend in close relation, one above the other in opposite directions, a pair of such pipes being provided in each chamber section of the oven, that is, substantially in line with each of the shafts 18 and 19, irrespective of the number of partition plates employed. The lower sections may have the coils omitted if it is desired to use them for cooling, and cold air supply means may be provided in them.

Figure 1:
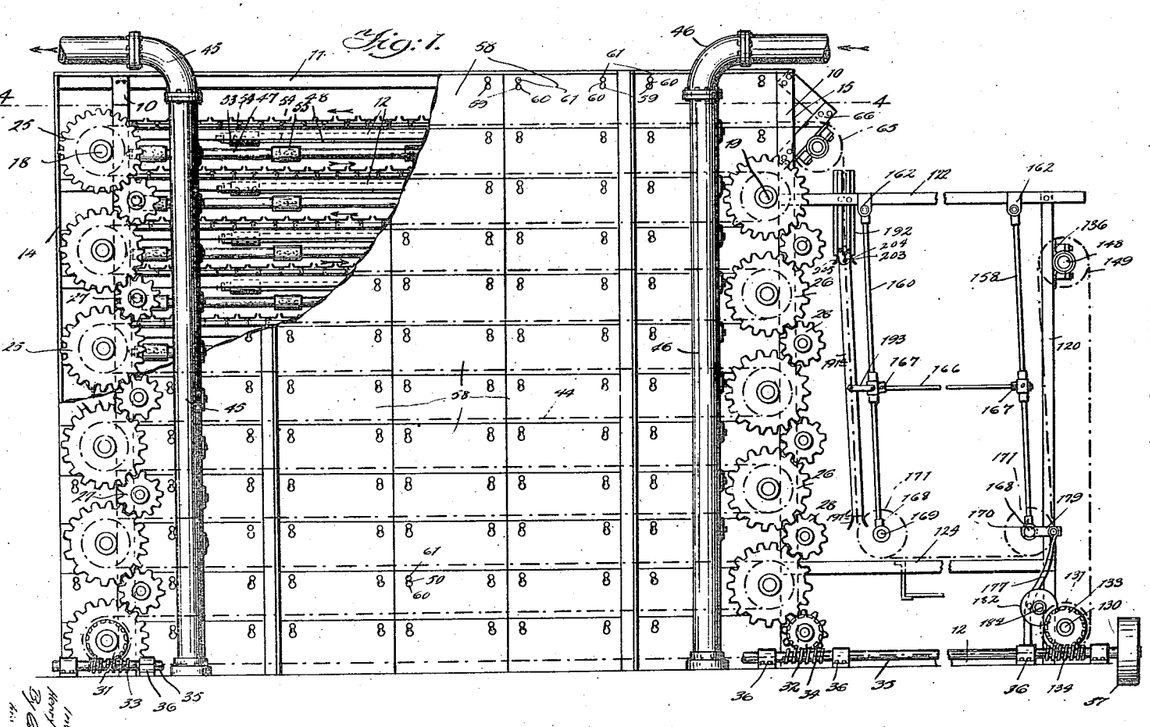
Figure 1 is a side elevation, partly broken away, of my improved apparatus.
Figure 2:
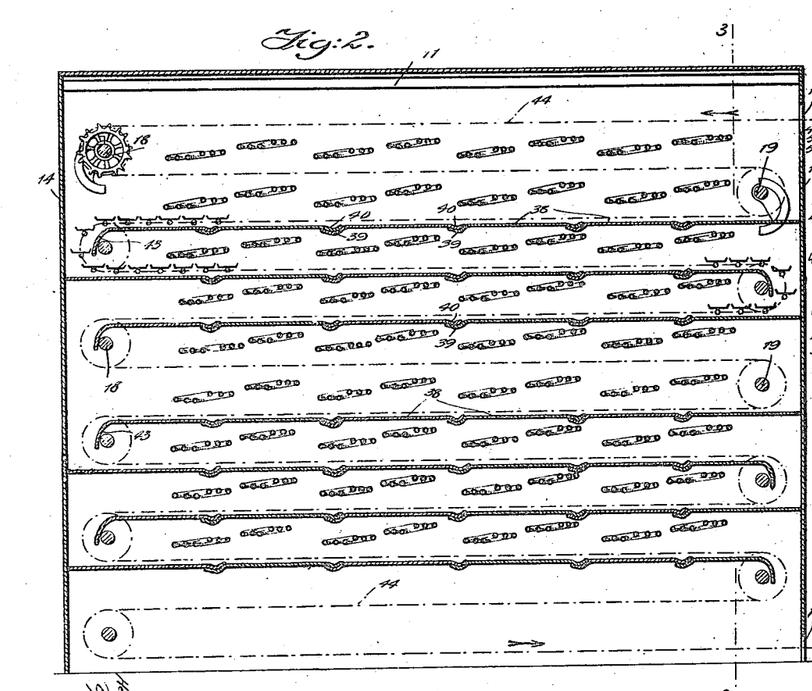
Figure 2 is a vertical longitudinal sectional view of the oven, taken along the line 2—2 of Figure 3.
Figure 3:
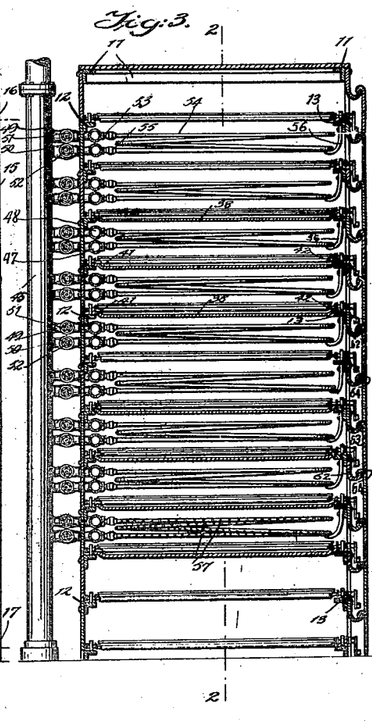
Figure 3 is a vertical transverse sectional view along the line 3—3 of Figure 2.
Figure 4:
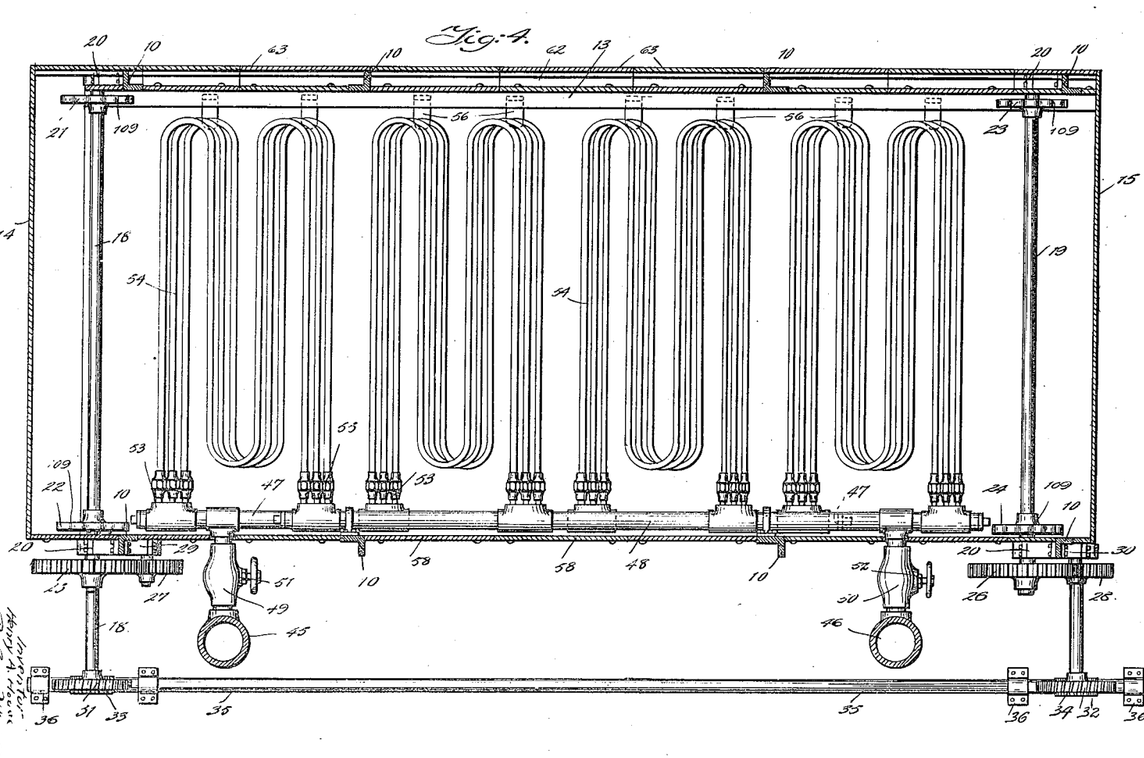
Figure 4 is a horizontal sectional view along the line 4—4 of Figure 1.

Connected to each of the pipes 47 at suitable points 53 are the outlet ends of triple coils 54, which extend transversely across the oven, and are doubled upon themselves twice. The inlet ends 55 of the coils 54 are connected to the pipe 48. Figure 3, in which I have only shown one coil in each section, clearly shows the direction the coils take. The outer ends of the coils are supported by hook members 56 secured to the angle bars 13.

The lowermost coils may be perforated as at 57, so that the heating agent (hot air, steam or the like) is admitted to the oven and acts directly upon the articles being baked, so as to drive off from them free moisture and gases formed in them during the baking operation.

The longitudinal sides of the oven are sectional, in order to permit of immediate access to any portion of its interior. One of such sides comprises rectangular plates 58, which are hung in closely adjacent relation to each other. As shown, the plates 58 are formed adjacent to their upper edges with slots 59 having enlarged portions 60 and arranged to engage supporting pins 61 carried by the angle bars 12. Secured to the angle bars 13 at the other side of the oven are hangers 62 upon which are hung sectional plates 63 provided at their upper edges with hooked portions 64 for this purpose. This construction provides channels at one side of the oven sections to accommodate a part of the conveyor, hereinafter referred to.

The conveyor enters the oven through the opening 16, being guided upon a sprocket 65 supported at the outer side of the oven upon brackets 66, secured to the uprights 10.

Figures 5 to 13 illustrate the conveyor employed in my improved apparatus. The conveyor preferably comprises generally a succession of trays carried by endless chains, and adapted to be always maintained in horizontal position so as to retain the dough thereon.

Figure 8:
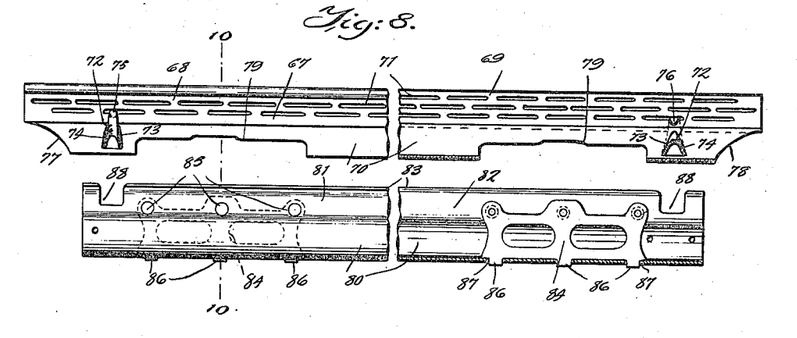
Figure 8 is a side view of the conveyor tray and tray holder, partly in elevation and partly in section.
Figure 9:
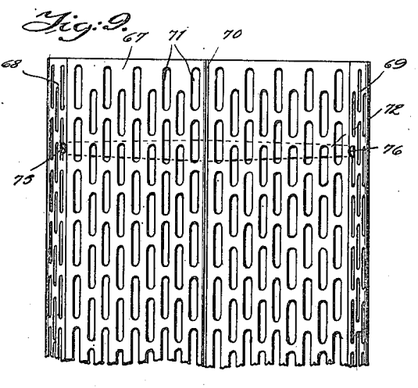
Figure 9 is a plan view of a portion of the tray.

The trays 67 are formed from thin sheet metal, capable of withstanding the high heat of the oven, without warping or being otherwise injuriously affected. The longitudinal sides of each of the trays are bent upwardly as at 68 and 69, and at its central portion the tray is bent upon itself into a depending longitudinal flange 70.

Elongated slots or perforations 71 are provided in the tray, the peculiar arrangement of these perforations permitting access of the heat to all portions of the dough, and resulting in a most effectual baking of the dough. To this end the perforations, which are arranged in rows are spaced apart at both the ends and the sides by a distance substantially corresponding to their width so as to allow direct application of heat to substantially half of the bottom surface of the dough. The perforations are also arranged in staggered relation to each other so that every portion of the dough will be either exposed to the direct application of heat through one of the perforations or will be so close to one of the perforations as to cause it to be thoroughly baked. With this construction it has been found in practice that all portions of the dough may be baked substantially uniformly and without any part of it being burned.

Stiffening ribs 72 are provided in suitably spaced relation transversely of the trays. The central portions of the ribs 72 are bowed as at 73. The ribs 72 are of inverted V-shape and are received in openings 74 in the flange 70. The end portions of the ribs 72 are flattened against the underside of the tray and are hooked as at 75 and 76 into certain of the perforations 71 in the sides 68 and 69. The halves of the tray are thus bound together, and the tray is effectually maintained against distortion so as to cause it always to present a flat dough supporting surface. The ends of the flange 70 are cut in as at 77 and 78, and intermediately of the ends there are provided cut out portions 79, the purpose of which will be presently pointed out.

Figure 10:
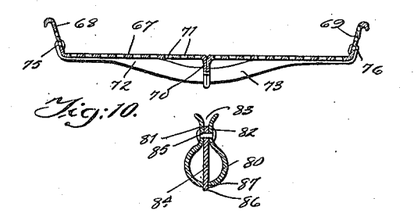
Figure 10 is a transverse sectional view along the line 10—10 of Figure 8.

The support for the tray is formed from a piece of sheet metal, having its intermediate portion bent into tubular form as indicated at 80 and having its edges 81 and 82 bent upwardly to form a spring retaining flange. The upper edges of the tray support are flared as at 83 to permit entrance of the flange 70 of the tray between them. In order to prevent twisting of the support and to strengthen the same, stiffening plates 84, preferably of skeleton form, are secured therein by means of rivets 85 passing through the portions 81 and 82. The lower edges of the plates 84 are provided with lugs 86 which engage openings 87 in the lower part of the tube portion 80. Any suitable number of these plates may be employed. Cut-out portions 88 are provided in the retaining flange of the support to receive the ribs 72, and the cut-out portions 79 of the tray embrace the stiffening plates 84. The tray, it will be seen, may be readily inserted and removed and is securely held in position.

Figure 5:
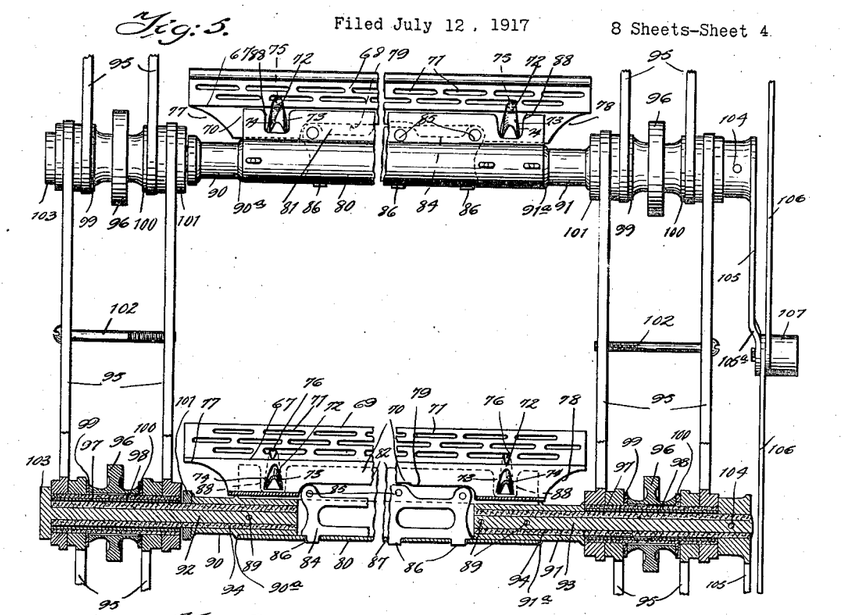
Figure 5 is a front view partly in elevation, and partly in section of a portion of the conveyor, showing the conveyor units, one above the other.
Figure 6:
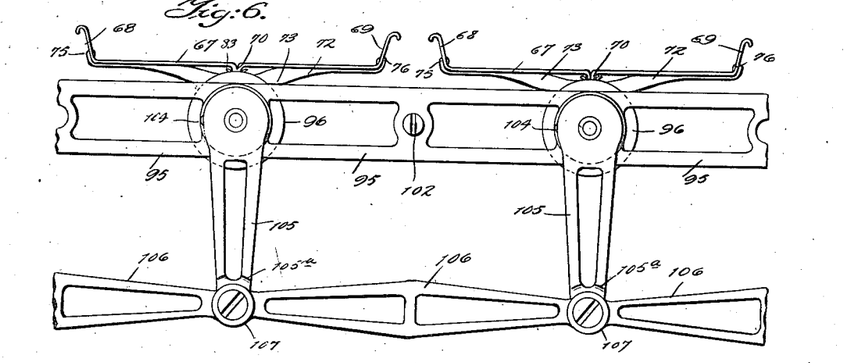
Figure 6 is a side view of a portion of the conveyor.
Figure 7:
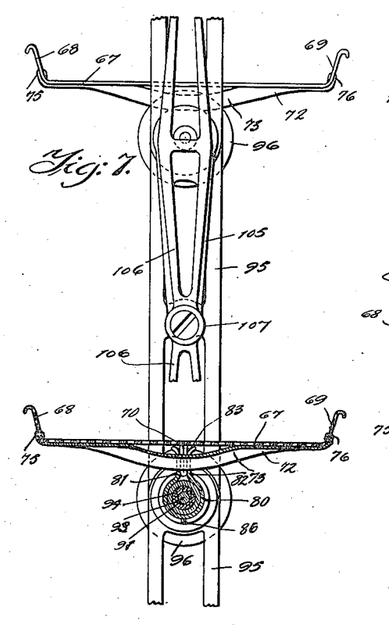
Figure 7 is a side view of the conveyor, partly in elevation and partly in section, the conveyor units being one above the other, as in Figure 5.

The hollow ends of the tray supports are non-rotatably trunnioned by means of cotter-pins 89 upon tubular bearings 90 and 91, mounted respectively upon spindles 92 and 93, and lubricating and heat-resisting sleeves of graphite 94 are interposed between the bearings and the spindles. The bearings are formed with annular shoulders 90[a] and 91[a] which engage the ends of the tray support. The spindles 92 and 93 and the graphite sleeves thereon, extend outwardly from the bearings 90 and 91, and the ends of pairs of links 95 extending in opposite directions from the spindles are journaled thereon. Between the ends of the links there is disposed a roller 96. A lubricating sleeve of graphite 97, lined with steel as at 98, is disposed between the ends of the links and the roller 96 on the one hand and each of the graphite covered spindles on the other. Graphite washers 99 and 100 are provided between the sides of the rollers and the links, so as to reduce friction therebetween. A washer 101 is also preferably provided between the links and the bearings 90 and 91. The links 95 are braced intermediate between their ends by screws 102 or other suitable means.

The outer ends of the spindles 92 are provided with heads 103, while on the outer ends of the spindles 93 there are secured by means of pins 104 the upper ends of depending lever arms 105. The links 95 are of suitable length, so that the ends of the trays are spaced a short distance apart. At the lower ends of the lever arms 105 there are pivotally secured auxiliary links 106, the function of which is to maintain the trays in horizontal position. The links 95 and 106 and the arms 105 are of skeleton form so as not to be affected in shape by the heat of the oven, and so as not to form a resisting surface to the flow of heat. Each of the lever arms 105 is slightly offset at its end 105$^a$, so that in the vertical position of the conveyor illustrated in Figures 5 and 7 the links 106 will clear the upper ends of the levers. Small guide rollers 107 are journaled upon the lower ends of the levers 105, outside of the links 106.

Figure 11:
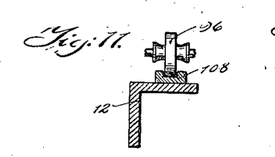
Figure 11 is a detail view showing the conveyor roller and track.

The rollers 96 run in tracks 108, provided along the angle bars 12 and 13, as shown in Figure 11. Upon leaving the tracks 108 they are engaged by the sprocket wheels 21, 22, 23 and 24 which for this purpose are of a peculiar construction, and in the form illustrated are provided with a series of recessed projections 109, into which the rollers successively fit. The depending auxiliary chains run along the channels formed by the hangers 62.

Figures 12, 13, 16, 20:
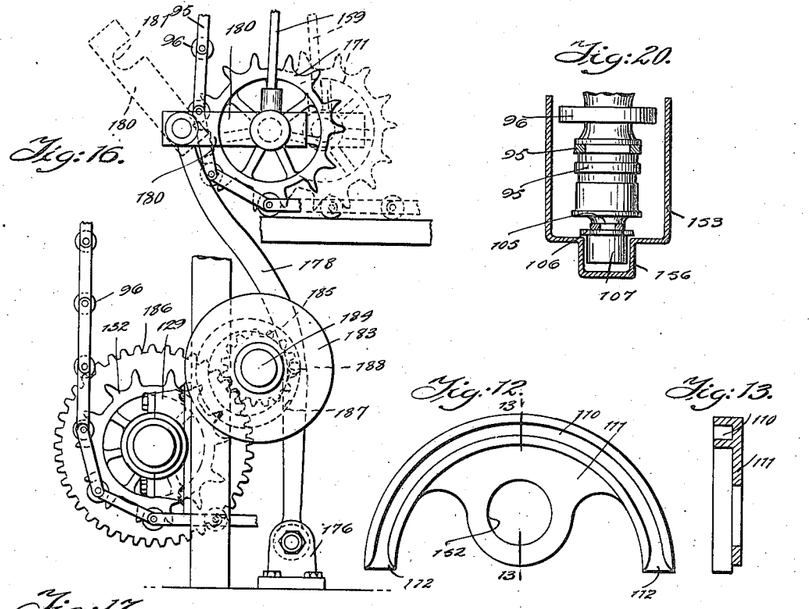
Figure 12 is a detail of one form of conveyor guide.
Figure 13 is a sectional view along the line 13—13 of Figure 12.
Figure 16 is a detail view of the cam mechanism employed therein.
Figure 20 is a sectional view along the line 20—20 of Figure 14.

As the conveyor is carried around the sprocket wheels, the small roller 107 of the auxiliary chain enters a semi-circular groove 110 provided in a plate 111, shown in detail in Figures 12 and 13, this plate being eccentrically arranged to the axis of the sprocket, so that the levers 105 are maintained in vertical position, and the trays, the movement of which are controlled through the said levers are held in horizontal position during the transition from one section of the oven to the next. The groove 110 is flared at its ends as at 112, so as to guide the rollers therein.

At the forward end of the oven, I provide a device shown in Figures 1 and 14 to 21, for automatically supplying the dough or other raw material, and for removing the finished product. A frame is provided, comprising the uprights 120 and 121 of angle iron, upper longitudinal cross channel-bars 122 and 123 projecting at their outer ends and secured to the upper ends of the said uprights 120 and 121, uprights 10 at the adjacent end of the oven, lower cross-bars 124 and 125 mounted inwardly upon brackets 126 and 127, and an upper transverse cross-bar 128 secured at its ends to the uprights 120 and 121. The lowermost bars 12 and 13 of the oven extend across the bars of the frame and form tracks for the conveyor, as hereinafter pointed out.

Figure 14:
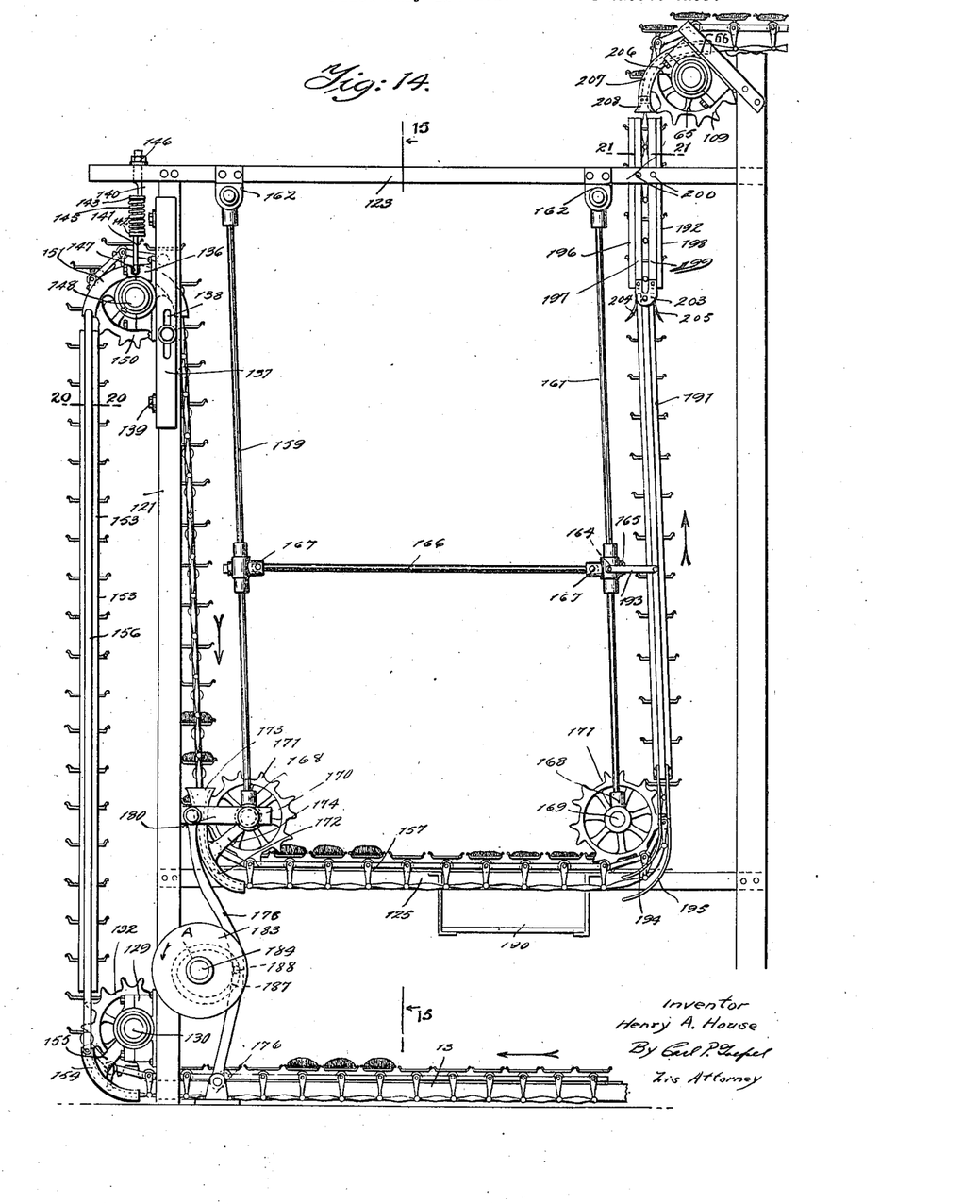
Figure 14 is a side elevation of the supply and removal device disposed in front of the oven.
Figure 15:
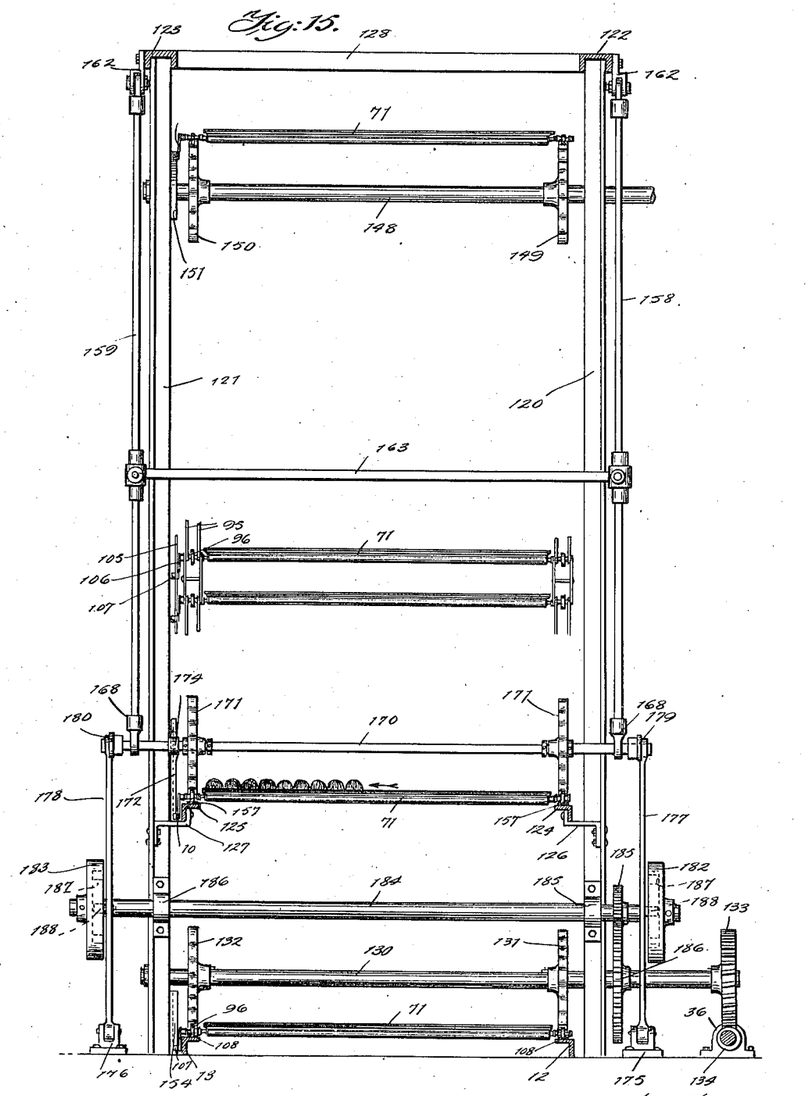
Figure 15 is a vertical sectional view thereof along the line 15—15 of Figure 14.
Figures 17, 18, 19:
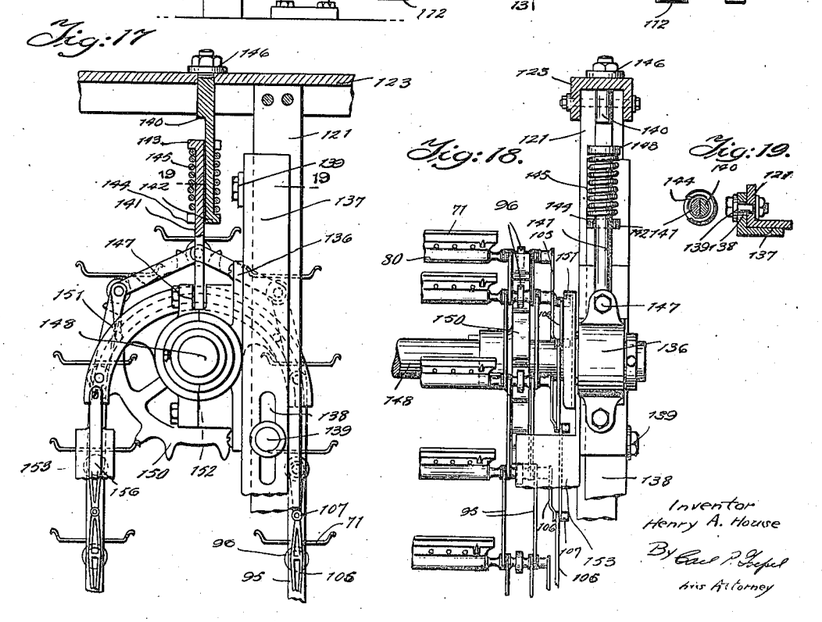
Figure 17 is a detail end view of the yieldable sprocket provided therein.
Figure 18 is a front view thereof.
Figure 19 is a sectional view along the line 19—19 of Figure 17.

At the lower portion of the frame, there are provided upon the uprights 120 and 121 bearing brackets 129 in which is journaled a shaft 130, provided within the frame with sprocket wheels 131 and 132 over which the conveyor chains are carried from the tracks upon the bars 12 and 13. As shown, the shaft 130 is driven by a worm gear 133, which engages a worm 134 provided on the main drive shaft 35.

At the upper part of the frame there are provided upon the uprights 120 and 121 slidable brackets comprising bearings 136 provided on angle irons 137, which embrace the uprights and are formed with elongated slots 138 into which extend stud bolts 139 provided on the uprights. The brackets are yieldingly supported by means of spring shackles (Figures 17 to 19) each comprising a pair of bolts 140 and 141, the contacting portions of which are semi-circular in cross-section and are provided at their opposite ends with flanges 142 and 143 respectively. The flanges 142 and 143 are slotted as at 144 to provide guide-ways for the bolts, a helical spring 145 being disposed upon the bolts between the flanges. The bolts 140 are secured by nuts 146 to the channel bars 122 and 123, and the bolts 141 are pivotally connected at 147 to the brackets. A shaft 148 is journaled at its ends in the bearings 136, and is provided within the frame with sprocket wheels 149 and 150, over which the conveyor chains are carried. The yielding support of the shaft 148 prevents any slack in the conveyor.

A semi-circular guide 151 for the small roller 107 of the auxiliary conveyor chain, similar to that shown in Figures 12 and 13, is mounted upon the bearing 136, the said guide being provided with an opening 152 therein which engages the shaft. The guide is mounted eccentrically so that the lever arms 105 are maintained in vertical position. An elongated guide 153 is connected at its upper end to the outer extremity of the guide 151, and is secured at its lower end to an eccentric guide member 154, which describes an arc of 90° and is connected by an arm 155 to the bearing 129, to guide the rollers 107 in passing around the sprocket 132. The guide 153 is shown in section in Figure 20. At its sides it embraces the chain, and centrally of its intermediate portion there is provided a recessed channel 156 which engages the small rollers 107. The guide 153, it will be noted, prevents any swinging of the tray.

From the sprocket wheels 149 and 150 the conveyor extends downwardly and across the tracks 157 of the cross bars 124 and 125, where the finished product is removed from the trays and the same are supplied with dough or other material to be baked. In order to permit of the removal and feeding automatically, the trays on the cross bars 124 and 125 are intermittently stopped, without disturbing the continuous movement of the rest of the conveyor. To this end, I provide a swinging frame comprising four rods 158, 159, 160 and 161 hingedly supported upon brackets 162, provided on cross bars 122 and 123. These rods are braced transversely by cross bars 163, rigidly connected to the rods by set screws 165, and longitudinally the rods are braced by bars 166 pivotally connected at their ends, as at 167, to the connecting member.

Bearing fixtures 168 are secured to the lower ends of the rods 158, 159, 160 and 161, in which are journaled shafts 169 and 170, the ends of the shaft 170 projecting beyond the bearing fixtures 168. Sprocket wheels 171 are loosely mounted on the shafts 169 and 170, which engage the rollers 96 of the conveyor chain. A guide for the small rollers 107 is provided at one side of the shaft 170, and comprises a channel member 172 flared at its entrance end as at 173, and eccentrically supported upon the shaft by an arm 174.

Upon brackets 175 and 176 secured to the frame at each side of the apparatus, there are pivotally mounted levers 177 and 178, connected at their upper ends to the projecting ends of the shaft 170 by latch members 179 and 180 pivoted at one end to the said levers and provided at their other ends with slots 181 which may be engaged or disengaged with the said projecting ends of the shaft, as clearly indicated in Figure 16. In the engaged position of the latch members, it will be seen the swinging frame will be moved with the levers 177 and 178.

The levers 177 and 178 are oscillated by means of a pair of cams 182 and 183 provided at the respective ends of a shaft 184, journaled in bearings 185 and 186 mounted upon the uprights 120 and 121, and adapted to be rotated through a pinion 185 and a gear 186 mounted respectively on said shaft and on the shaft 130, which is driven as before pointed out by the worm 133 from the main drive shaft.

The grooves 187 of the cams, which are engaged by rollers 188 on the levers 177 and 178, are of a peculiar formation. As shown, each of said grooves consists of a rising portion extending over two thirds of the circumference of the cams, that is, from the point A in Figure 14 to the point where the roller 188 is shown, and a descending portion extending over one third of the circumference. This results in a relatively slow movement of the frame toward the left in Figure 14 (or the right in Figure 1), and a relatively quick movement in the other direction. The action upon the conveyor is as follows: As the frame moves to the left with a relatively slow movement (Figure 14), the sprocket wheels 171 at the left of the frame engage the descending portion of the conveyor, laying the same down on the tracks, the portion upon the tracks remaining stationary during this period, and at the right the sprocket wheels release the conveyor, permitting the same to ascend. The relatively quick movement of the frame to the right moves the whole section of the conveyor extending about the frame, that is, the descending portion, the portion on the tracks and the ascending portion. Thus, there is an intermittent relatively long stopping of the conveyor upon the tracks, while the continuous movement of the rest of the conveyor is uninterrupted. During this stopping movement the completed biscuits or other products are removed and new dough or raw material is supplied. This may be accomplished by any suitable apparatus, but preferably by a reciprocating means which may be projected over the trays, automatically dropping the dough thereon, and at the same time sliding the completed products from the adjacent trays into suitable receptacles.

Should any part of the machine become out of order so as to stop the movement of the conveyor, the swinging frame may be stopped by throwing up the latch members 179 and 180 out of engagement with the shaft 170. In order to prevent the dough from piling up upon the trays, the trays beneath the feeding means may be removed from the tray support, and the dough will drop into a receptacle 190 suspended from the cross bars 124 and 125. By manually moving the swinging frame the tray holders may be moved out of the path of the falling dough.

As the conveyor leaves the sprocket wheels 171, it ascends in engagement at one side with a guide 191, and at the other with a guide 191$^a$, pivotally supported from stationary guides 192 secured to the cross bars 122 and 123. The guides 191 and 191$^a$ are of similar cross section to the guide 153, and are connected to the swinging frame by links 193, so as to swing therewith. At its lower end the guide 191$^a$ is flared as at 191$^b$, while the lower end of the guide 191 is provided with an eccentric guide for the small rollers 107, comprising two metal strips 194 and 195, flared outwardly for a sufficient distance to engage the said rollers in both of the positions of the swinging frame.

Figure 21:
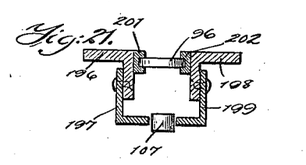
Figure 21 is a sectional view along the line 21—21 of Figure 14.

The guide 192, shown in section in Figure 21, comprises a pair of angle pieces 196 and 197, riveted together in the form of the letter S and a similar pair of angle pieces 198 and 199 opposed thereto, the two pairs being secured at 200 in spaced relation upon the cross bar 123. Tracks 201 and 202, secured to the inner sides of the pieces 196 and 198, engage the large rollers 96 of the chain, the small rollers 107 being engaged in the space between the pieces 197 and 199. At the lower end of the guide 192 there is secured a bracket 203, to which the guide 191 is pivoted, and two flared guide pieces 204 and 205 are provided at each side, which serve to guide the rollers therebetween and also to permit swinging of the guide 191.

At the upper end of the guide 192, there is secured to a bracket 66 by an arm 206 an eccentric guide 207 for the small roller 107. The guide 207 is similar to the guide 172 and is flared outwardly at its entrance end 208. The conveyor moves over the sprocket wheels 109 into the oven, where it runs along the tracks provided therein, as before pointed out.

With my improved baking apparatus, a great quantity of biscuits or other products may be baked, in a comparatively short time, and the baking is both uniform and thorough. The action is entirely automatic, and does not require the services of an expert baker. By reason of my improved structure, very little deterioration occurs from the working of the parts or the heat coming in contact therewith, and as the parts are standardized, substitution of defective parts may be quickly effected.

I have illustrated a preferred and satisfactory form of my invention, but it is obvious that changes may be made therein within the spirit and scope thereof, as defined in the appended claims.

I claim:

1. In a cooking apparatus, a cooking chamber, a plurality or removable partitions forming compartments in said chamber, a continuous conveyor adapted to move into said chamber, successively through said compartments and out of said chamber, heating means in said compartments and means for controlling the admission of a heating agent to said means to enable said compartments to be heated to varying temperatures.

2. In a cooking apparatus, a cooking chamber, means for heating said chamber comprising a feed pipe, a waste pipe, a plurality of coils arranged transversely and in superposed relation in said chamber and having their inlet and outlet ends communicating respectively with said feed and waste pipes, means for separately controlling the admission of a heating agent to said superposed coils, and a continuous conveyor adapted to move into said chamber successively between said coils, and out of said chamber.

3. In a cooking apparatus, a cooking chamber, means for heating said chamber comprising a feed pipe, a waste pipe, a plurality of superposed distributing pipes alternately connected to said feed and waste pipes respectively, means for separately controlling said distributing pipes, a plurality of coils arranged transversely in said chamber and having their inlet and outlet ends connected respectively to the first-mentioned and last-mentioned distributing pipes, and a continuous conveyor adapted to move into said chamber, successively between said coils and out of said chamber.

4. In a cooking apparatus, a cooking chamber divided horizontally into a series of superposed compartments, a continuous conveyor movable into said chamber thru the several compartments thereof and out of said chamber, the side walls of said chamber consisting of several series of metallic detachable plates corresponding respectively with the compartments of said chamber.

5. In a cooking apparatus, a cooking chamber, means for heating said chamber, a continuous conveyor adapted to move into, through and out of said chamber, and means adapted to intermittently stop a portion of said conveyor during the uninterrupted movement of the remainder of said conveyor to permit feeding and removal of the products.

6. In a cooking apparatus, a continuous conveyor comprising a succession of trays, means for frictionally supporting said trays to permit ready removal and replacement of the trays, chain members pivotally carrying said supporting means, sprocket wheels at the bends of said chain members, and means rigidly connected to said supporting means for maintaining said trays in a horizontal position above the pivots of their supports irrespective of the direction of travel of said chain members, and curved guides adjacent the bends eccentric to said sprocket wheels.

7. In a cooking apparatus, a conveyor comprising parallel and spaced chain members, rollers carried by said chain members, a succession of transverse supporting members trunnioned between said chain members, trays engaged with said supporting members, means rigidly connected to said supporting members, rollers carried by said rigidly connected means, guiding means for said first mentioned rollers, curved eccentric and guiding means for said last mentioned rollers adapted to maintain said trays in horizontal position above the pivots of their supports irrespective of the direction of travel of said chain members.

8. In a cooking apparatus, a conveyor comprising parallel and spaced chain members, rollers carried by said chain members, a succession of transverse supporting members trunnioned between said chain members, trays engaged with said supporting members, means rigidly connected to said supporting members, rollers carried by said rigidly connected means, guide means for said first mentioned rollers, curved eccentric guiding means for said last mentioned rollers adapted to maintain travel of said trays in horizontal position above the pivots of their supports irrespective of the direction of said chain members, and means connecting said rigidly connected means to maintain all of said trays in uniform relation with each other.

9. In a cooking apparatus, a conveyor comprising parallel and spaced chain members, trunnions pivotally connected to said chain members, a succession of transverse supporting members respectively carried by and rigidly connected to said trunnions, trays mounted on the supporting members, rollers mounted on said trunnions, lever arms rigidly connected to the trunnions carried by one of the chain members, links connecting said lever arms adapted to maintain all of said trays in uniform relation with each other, rollers carried by said lever arms, guiding means for said first mentioned rollers, and curved eccentric guiding means for said last mentioned rollers adapted to maintain said trays in horizontal positions above the pivots of their supports irrespective of the direction of travel of said chain members.

10. In a cooking apparatus, a conveyor comprising parallel and spaced chain members, trunnions pivotally connected to said chain members, a succession of transverse supporting members respectively carried by and rigidly connected to said trunnions, trays mounted on the supporting members, rollers mounted on said trunnions, lever arms rigidly connected to the trunnions connected to one of the chain members, links connecting said lever arms adapted to maintain all of said trays in uniform relation with each other, rollers carried by said lever arms, guiding means for said first mentioned rollers, guide means for said last mentioned rollers adapted to maintain said trays in horizontal positions irrespective of the direction of travel of said chain members, and lubricating and heat resisting means disposed between the contacting and heat affected parts of said conveyor.

11. In a cooking apparatus, a conveyor comprising parallel and spaced chain members, trunnions pivotally connected to said chain members, a succession of transverse supporting members respectively carried by and rigidly connected to said trunnions, trays mounted on the supporting members, rollers mounted on said trunnions, lever arms rigidly connected to the trunnions connected to one of the chain members, links connecting said lever arms adapted to maintain all of said trays in uniform relation with each other, rollers carried by said lever arms, guiding means for said first mentioned rollers, guiding means for said last mentioned rollers adapted to maintain said trays in horizontal positions irrespective of the direction of travel of said chain members, and lubricating and heat resisting means disposed between said first mentioned rollers, said chain members and said trunnions.

12. In a cooking apparatus, a conveyor comprising parallel and spaced chain members, trunnions pivotally connected to said chain members, a succession of transverse supporting members respectively carried by and rigidly connected to said trunnions, trays mounted on the supporting members, rollers mounted on said trunnions, lever arms rigidly connected to the trunnions connected with one of the chain members, links connecting said lever arms adapted to maintain all of said trays in uniform relation with each other, rollers carried by said lever arms, guiding means for said first mentioned rollers, and guiding means for said last mentioned rollers adapted to maintain said trays in horizontal positions irrespective of the direction of travel of said chain members, and graphite bearing members disposed between the contacting moving and heat affected parts of said conveyor.

13. In a cooking apparatus, a conveyor comprising parallel and spaced chain members, rollers carried by said chain members, a succession of transverse supporting members trunnioned between said chain members, trays engaged with said supporting members, means rigidly connected to said supporting members, rollers carried by said rigidly connected means, longitudinal tracks for said first mentioned rollers, sprocket means at the ends of said longitudinal tracks provided with teeth adapted to engage said first mentioned rollers, cams eccentric to said sprocket means adapted to engage and guide said last mentioned rollers to maintain said trays in horizontal position irrespective of the direction of travel of said chain members.

14. In a cooking apparatus, a conveyor comprising chain members, tray supporting means carried by said chain members comprising transverse members, and transverse spring flanges thereon, trays adapted to be engaged between said spring flanges, and means adapted to maintain said trays in a given position irrespective of the direction of travel of the chain members.

15. In a cooking apparatus, a conveyor comprising chain members, tray supporting means carried by said chain members comprising transverse members, and transverse spring flanges thereon, a tray, a flange on said tray adapted to be engaged between said spring flanges, and means adapted to maintain said trays in a given position irrespective of the direction of travel of said chain members.

16. In a cooking apparatus, a conveyor comprising chain members, tray supporting means carried by said chain members comprising transverse tubular members, spring flanges formed therein, trays adapted to be engaged between said spring flanges, and means adapted to maintain said trays in a given position irrespective of the direction of travel of said chain members.

17. In a cooking apparatus, a conveyor comprising chain members, tray supporting means carried by said chain members, comprising transverse tubular members, reinforcing plates secured in said tubular members, and spring flanges formed on said tubular members, trays adapted to be engaged between said spring flanges, and means adapted to maintain said trays in a given position irrespective of the direction of travel of said chain members.

18. In a cooking apparatus, a conveyor comprising chain members, tray supporting means carried by said chain members comprising transverse members, and transverse retaining portions on said members, trays adapted to be engaged with said retaining portions, means for positioning said trays transversely of the retaining portions of said transverse members, and means adapted to maintain said trays in a given position irrespective of the direction of travel of said chain members.

19. In a cooking apparatus, a cooking chamber, means for heating said chamber, a continuous conveyor adapted to move into, through and out of said chamber, and means adapted to intermittently stop a portion of said conveyor during the uninterrupted movement of the remainder of said conveyor to permit feeding and removal of the products, said means comprising a track for a portion of said conveyor and reciprocating means adapted to engage said conveyor on said track, said reciprocating means being adapted to alternately feed forward and stop the portion of the conveyor on the track and at the same time to permit the parts of the conveyor at each side of said portions to move forward continuously.

20. In a cooking apparatus, a cooking chamber, means for heating said chamber, a continuous conveyor adapted to move into, through and out of said chamber, and means adapted to intermittently stop a portion of said conveyor during the uninterrupted movement of the remainder of said conveyor to permit feeding and removal of the products, said means comprising a track for a portion of said conveyor, a reciprocating frame, and freely rotatable sprockets on said frame engaging said conveyor in spaced relation on said track, the portion of said conveyor between said sprockets being adapted to be alternately fed forward and stopped and the portions of said conveyor at each side of said sprockets being moved forward continuously.

21. In a cooking apparatus, a cooking chamber, means for heating said chamber, a continuous conveyor adapted to move into, through and out of said chamber, and means adapted to intermittently stop a portion of said conveyor during the uninterrupted movement of the remainder of said conveyor to permit feeding and removal of the products, said means comprising a track for a portion of said conveyor, a swinging frame, freely rotatable sprockets on said frame engaging said conveyor in spaced relation on said track, means for reciprocating said frame, and means for releasing said frame from said reciprocating means, to permit free manual swinging or stopping of said frame, the portion of said conveyor intermediate between said sprockets being adapted to be alternately fed forward and stopped and the portions of said conveyor at each side of said sprockets being moved forward continuously.

22. In a cooking apparatus, a cooking chamber, means for heating said chamber, a continuous conveyor adapted to move into, through and out of said chamber, and means adapted to intermittently stop a portion of said conveyor during the uninterrupted movement of the remainder of said conveyor to permit feeding and removal of the products, said means comprising a track for a portion of said conveyor and reciprocating means adapted to engage said conveyor on said track, said reciprocating means being adapted to alternately feed forward for a relatively short period, said portion of the conveyor on said track and to stop said portion for a relatively long period, the parts of said conveyor at each side of said portion being moved forward continuously.

23. In a cooking apparatus, a cooking chamber, means for heating said chamber, a continuous conveyor adapted to move into, through and out of said chamber, and means adapted to intermittently stop a portion of said conveyor during the uninterrupted movement of the remainder of said conveyor to permit feeding and removal of the products, said means comprising a track for a portion of said conveyor, reciprocating means adapted to engage said conveyor on said track, and cam means for reciprocating said reciprocating means, the portion of said conveyor on said track being alternately fed forward and stopped thereby, and said cam means being adapted to move said reciprocating means with a relatively quick movement in one direction and with a relatively slow movement in the other direction, so as to feed the portion of the conveyor on the track forward in a relatively short period and to stop the same for a relatively long period on said track, the parts of said conveyor at each side of said portion being moved forward continuously.

24. In a cooking apparatus, a cooking chamber, means for heating said chamber, a continuous conveyor adapted to move into, through and out of said chamber, means adapted to intermittently stop a portion of said conveyor during the uninterrupted movement of the remainder of said conveyor to permit feeding and removal of the products, said means comprising a track for a portion of said conveyor and reciprocating means adapted to engage said conveyor on said track, said reciprocating means being adapted to alternately feed forward and stop the portion of the conveyor on said track and at the same time to allow the parts of the conveyor at each side of said portion to move forward continuously, and a receptacle beneath said track.

25. In a cooking apparatus, a cooking chamber, means for heating said chamber, a continuous conveyor adapted to move into, through and out of said chamber, means exterior of said chamber to permit carrying said conveyor horizontally and vertically for a relatively long distance exterior of said chamber, and guiding means engaging said conveyor in its vertical position to prevent lateral movement thereof.

26. In a cooking apparatus, the combination of a cooking chamber, means for heating said chamber, a continuous conveyor movable into, thru and out of said chamber comprising chain members, fixed sprocket wheels carrying said chain members, a swinging frame carrying sprocket wheels engaging said chain members and adapted to swing in a direction reverse to the movement of said conveyor and operate practically as a stop for a portion thereof.

27. In a baking machine, an oven, an endless conveyor passing through said oven and having a portion thereof located without the oven, and means for moving the conveyor continuously through the oven and for simultaneously intermittently moving a portion of the conveyor located without the oven.

In testimony that I claim the foregoing as my invention, I have signed my name in presence of a subscribing witness.

HENRY A. HOUSE.

Witness:
MOE M. WEINBERG.